Aug. 25, 1942.   W. C. ROBINSON   2,293,850
MULTIPLE-OUTLET RACEWAY
Filed Sept. 23, 1939
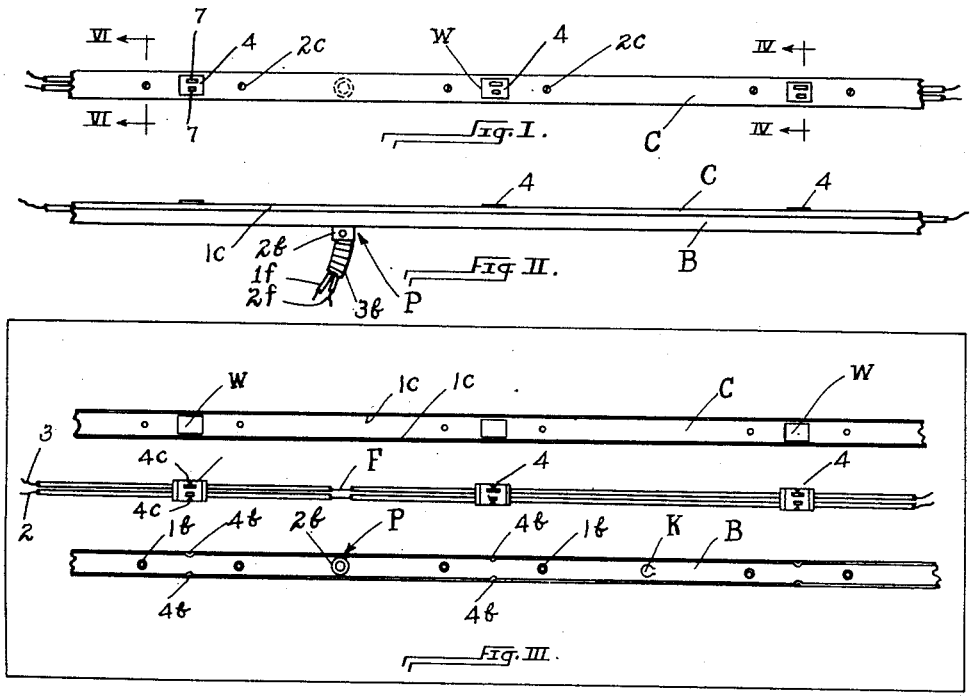
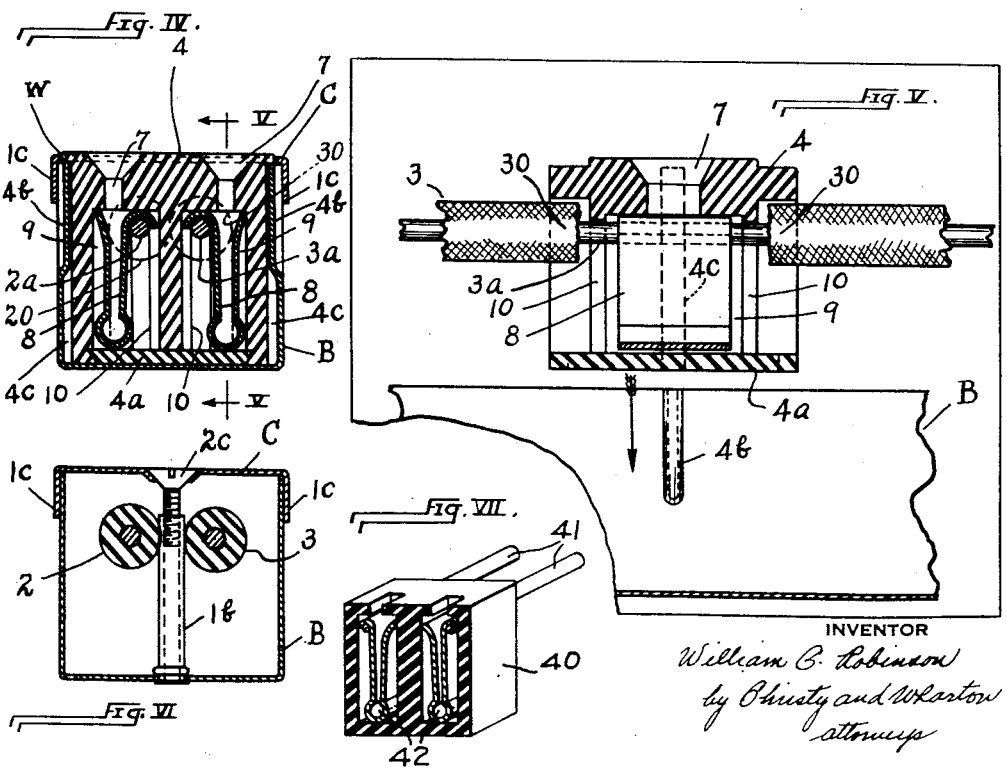
INVENTOR
William C. Robinson
by Christy and Wharton
attorneys Patented Aug. 25, 1942

2,293,850

UNITED STATES PATENT OFFICE 2,293,850

MULTIPLE-OUTLET RACEWAY

William C. Robinson, Sewickley, Pa., assignor to National Electric Products Corporation, a corporation of Delaware Application September 23, 1939, Serial No. 296,287

1 Claim. (Cl. 173—334.1)

This invention relates to the electrical wiring of buildings, more particularly to an assembly of electrical conductors and receptacles used in such wiring, and to an improved raceway for housing such conductors and receptacles.

The electrical conductors may consist in two (or more) individually insulated circuit wires extending side by side in common reach, or they may consist in the conductors of a multiple-conductor cable. In either case a plurality of plug-in receptacles (or other desired electrical devices) are electrically and mechanically secured to the conductors at longitudinally spaced-apart points.

The invention consists in a raceway structure that is particularly adapted for the housing of a cable and receptacle assembly of this sort, and in the organization of such assembly in the raceway.

The raceway is formed in two parts, an elongate channel member and a windowed cover for the channel. The receptacle-equipped conductors (or cable) may be supplied to the trade already assembled in unit lengths of the raceway, with the effect that it is merely necessary for the user to install the desired number of units end to end upon the wall of the building, or other structure to be wired, and then interconnect the terminals of the conductors at the abutting ends of the several units. Thus, a multi-outlet assembly (sometimes known as plug-in strip) of desired continuous length is provided.

Alternately, the receptacle-equipped conductors (or cable) may be supplied to the user before assembly in the raceway, and in such case it will be supplied in relatively great lengths, say in coiled lengths of 250 feet, more or less. In the field a continuous raceway channel is first provided, by installing the required number of raceway channel units or sections end to end upon or in the walls of the building, or other structure being wired. In this way a continuous raceway channel of specified length is provided. Next, a suitable length of the receptacle-equipped conductors or cable is cut from the coil and assembled in the installed channel. And then the raceway cover units are secured upon the assembly, with the receptacles, thus housed in the raceway, in registry with the windows in the cover. The value of this practice is that the multi-outlet structure (plug-in-strip) may be assembled in the field. It is in effect a continuous structure, a structure that may extend without interruption around the four walls of a room, without requiring, as in the practice first mentioned, the splicing or other interconnection of the conductors between successive unit lengths of raceway.

My invention is particularly directed to a refinement in the structure of the raceway, to the end that the receptacles assembled with the conductors in the raceway may be readily and accurately registered and secured in registry with the windows in the raceway cover. The refinement of the invention is particularly, though not exclusively, valuable in the practice of field assembly, as described.

In the accompanying drawing Fig. I is a fragmentary view in plan of a multi-outlet assembly, or plug-in strip, embodying the invention; and Fig. II is a view in side elevation of the same.

Fig. III is an exploded view of the assembly, showing the receptacle-equipped conductors and a section of the channel portion of the raceway in plan from above, and the cover portion of the raceway in plan from beneath.

Fig. IV is a view showing the complete assembly to larger scale and in cross section, on the plane IV—IV of Fig. I, and illustrating in detail one of the plug-in receptacles.

Fig. V is a fragmentary view, showing in longitudinal section (on the plane V—V of Fig. IV, and on the scale of Fig. IV) one of the plug-in receptacles on the conductors or cable, in position to be introduced to the basal portion of the raceway.

Fig. VI is a cross-sectional view of the assembly, on the plane VI—VI of Fig. I, and on the scale of Figs. IV. and V.

Fig. VII is a broken isometric view of a modified form of housing.

Referring to Fig. II of the drawing, the basal or channel member of the raceway is shown at B, and the cover at C. The channel is of deep U-shape in cross section; it is made of sheet metal in units or sections that are several feet in length. Likewise the cover is formed of sheet metal in unit lengths; it is of U-shape in cross section, including two flanges *1c* that, with the cover positioned upon the open side of the basal channel member B, overlie the opposite side walls of such channel member, as shown in Figs. IV and VI. The cover is provided with windows W at predetermined spaced-apart points in its length. In assembly the channel member and cover, or a plurality of unit lengths of such channel member and cover, provide the elongate raceway or housing in which the receptacle and conductor assembly (mentioned above) is housed, with the receptacles 4 on the conductors 2, 3 severally in registry with and accessible in the windows W in the cover. See Figs. I and IV. The cover is secured in assembly with the channel member of the raceway, by means of screws 2c (Fig. I and VI) engaging internally threaded tubular studs 1b that are rigid with the floor of the channel member. At suitably spaced-apart points in the floor of the channel member knock-outs K (Fig. III) are provided, so that an opening may in known way be made in the floor of the channel member for the introduction of electrical feed wires to the conductors housed within the raceway. In Figs. II and III, I illustrate that such an opening has been provided at the point P, with a conventional connector 2b arranged to secure the end of an armored cable 3b to the floor of the channel. The feed wires 1f and 2f of such cable are thus introduced through the floor of the raceway and spliced or otherwise electrically connected to the receptacle-equipped conductors which are assembled in the raceway, as will presently appear.

In structure such receptacle-equipped conductors (or cable) consist in this case in two insulated flexible conductor wires 2 and 3, that extend side by side and carry a plurality of plug-in receptacles 4, arranged at predetermined intervals in the common reach of the paired conductor wires. The receptacles are electrically connected to the paired conductors 2 and 3, and it will be noted that the bodies of such receptacles are of regular or symmetrical external contour, to the end that they will not interfere with the coiling of the conductors in the factory, nor will they become snagged with the turns of the coil in such manner as to impede ready uncoiling in the field. It will further be noted that the bodies of the receptacles are self-sustaining in assembly with the conductors; the receptacles are of sturdy construction, consideration being given both to structural shape and to the insulating material of which they are formed; and they are so far infrangible as to endure the shocks and other stresses encountered when, as the paired conductor wires are unwound from the coil, they knock against one another, or fall upon the ground or floor.

Turning to a more minute consideration of the receptacle and conductor assembly, it will be understood that the insulation is cut away from each conductor 2 and 3 at the points where the receptacles are to be installed, and ordinarily these points will be uniformly spaced apart in the continuous length of the paired conductors. At each of such points two contact clips 8 (of suitable form to receive the contact prongs of a conventional electric attachment plug) are severally welded or otherwise electrically and mechanically secured to the bared body portions of the conductor wires 2 and 3, and upon each pair of contact clips thus secured to the conductors, I assemble and secure a receptacle housing 4.

Preferably, the receptacle housings are so formed that they may be readily applied and secured in all-enclosing assembly upon the paired contact clips 8, and upon the ends 20 and 30 of the insulation adjacent to the bared portions of the wires. Advantageously, each receptacle housing is formed in two parts—an upper or main body portion, to which the reference numeral 4 is immediately applied, and a disk-like bottom portion, to which the reference character 4a is applied. The housing portions 4 and 4a may be formed of rubber, "Bakelite," or other suitable insulating material, preferably a material that may be molded. The main body portion 4 is internally recessed, providing chambers 9, 9, in which the two contact clips 8, 8, electrically isolated from one another, are effectively enclosed. Openings 7, 7 are provided in the main body portion 4, to permit the prongs of an electrical attachment plug to be pressed into electrical contact with the clips, and slots 10 open from the contact-clip-enclosing chambers 9, 9 and extend through the opposite ends of the body 4, to admit of the passage through of the conductor wires, as shown in Fig. V.

In the modification shown in Fig. VII, the receptacle housing may be formed as a unit. Thus, the housing 40 is formed by being integrally molded. In order to accomplish this, the conductors 41 are stripped of their insulation at places where the housings are to be mounted, and the clips 42 are attached to the bare conductors. Thereafter, the housings 40 are molded around the clips and the wires.

In the field the installation of the receptacle-equipped conductors 2, 3 in the raceway is readily accomplished, it being understood that the required continuous length of raceway channel is first installed, by the assembly of the required number of channel units B, upon the wall of the building, or other structure being wired. Specifically, a continuous length of the paired receptacle-equipped conductors, a length equal to (or suitable to) the length of the installed raceway channel, is cut from the supply coil. If the feed lines (1f, 2f) are introduced to the channel at some point intermediate its opposite ends, as in this case they are shown to be, the insulation is removed from the paired conductors at the proper point (F, Fig. III) to adapt the conductors for electrical union with the terminals of said feed lines. When such union or connection of the feed lines to the conductors 2, 3 has been made and insulated, the conductors are laid in the continuous channel. The conductors extend in uninterrupted continuity from one end of the channel to the other; they straddle the screw-receiving studs 1b, as shown in Fig. VI, and the bodies of the spaced-apart receptacles 4 on the conductors are snugly seated in the channel, as shown in Fig. IV. When such assembly has been made the raceway cover (comprising the required number of cover sections C) is assembled upon the channel and secured, with the receptacles 4 severally registered with the windows W in such cover, as shown in Figs. I and IV.

In the making of such raceway assemblies, one of the problems has been to obtain and maintain precise registry of the several receptacle bodies 4 on the paired conductors 2, 3 with the several windows W in the raceway cover. In the solution of such problem, I provide means that cooperate with the receptacle bodies in insuring the desired registry. Such means, advantageously, are provided in the raceway, and, advantageously, they consist in ribs or lugs 4b formed in, or secured upon, the side walls of the raceway channel, at points spaced apart longitudinally of the channel identically as the windows W are spaced apart in the raceway cover. In this case the receptacle-positioning elements 4b consist in portions that are pressed or embossed in the sheet metal bodies of the channel side walls, and they are provided in pairs, aligned transversely of the channel as shown in Fig. III. The bodies of the receptacles are provided on opposite sides with complementary grooves 4c, and, when the receptacle-equipped conductors are assembled in the raceway channel, in the manner indicated by the arrow in Fig. V, the ribs 4b on the channel side walls enter the grooves 4c in the receptacle bodies, and thus insure accurate center-to-center spacing of the receptacles longitudinally of the raceway—spacing that is identical with the center-to-center spacing of the windows in the raceway cover. In such manner the receptacles are positioned and secured for precise registry with the windows in the cover.

In order to make accommodation for such slight irregularity as may exist in the spacing of the receptacles on the conductors 2, 3, I provide for the relative adjustment of the receptacle housings longitudinally of the conductors. Specifically, the contact-clip-enclosing chambers 9, 9 within the receptacle bodies are made of greater extent longitudinally of the conductors than the contact clips 8. Note Fig. V. It will be understood that, while the clips 8 may be, as in this case, firmly secured to the metal bodies of the conductors, the receptacle housings may be severally adjusted through an interval equal to the difference in length between the chambers 9 and the clips 8. Thus, the receptacle bodies may be readily positioned on the registering means or devices 4b, even though there be slight inaccuracy in the spacing of the receptacles on the conductors.

I claim as my invention:

In a duct comprising a raceway having window openings at longitudinally spaced intervals, plural electric conductors extended continuously through the raceway; insulating housings within the raceway, the said housings having prong-receiving apertures and enclosed cavities wider than the said apertures in directions extended longitudinally of the assembly, the said housings also having end openings larger than the electrical conductors, by way of which the said conductors extend continuously through the said housings and cavities, contact elements rigidly secured to the electrical conductors at intervals corresponding to those between the window openings and enclosed in the cavities of the housings, the said contact elements being wider than the prong-receiving apertures and narrower than the cavities in directions extended longitudinally of the assembly, whereby the said housings and conductors are relatively movable in directions extended longitudinally of the assembly, the walls of the said housings adjacent the end openings and the contact elements being relatively arranged for contact to limit their relative movement, and means for positioning the said housings in the raceway in registry with the window openings and with the prong-receiving apertures accessible through them.

WILLIAM C. ROBINSON.